United States Patent
Bhaskara et al.

(10) Patent No.: US 9,935,826 B2
(45) Date of Patent: Apr. 3, 2018

(54) SYSTEMS AND METHODS FOR PROVISIONING ETHERNET SERVICES

(71) Applicant: Infinera Corporation, Annapolis Junction, MD (US)

(72) Inventors: Vasudha N. Bhaskara, Milpitas, CA (US); Dharmendra Naik, San Jose, CA (US)

(73) Assignee: Infinera Corporation, Sunnyvale, CA (US)

( * ) Notice: Subject to any disclaimer, the term of this patent is extended or adjusted under 35 U.S.C. 154(b) by 265 days.

(21) Appl. No.: 14/986,475

(22) Filed: Dec. 31, 2015

(65) Prior Publication Data

US 2017/0195174 A1    Jul. 6, 2017

(51) Int. Cl.
*H04L 12/24* (2006.01)
(52) U.S. Cl.
CPC ............................... *H04L 41/0806* (2013.01)
(58) Field of Classification Search
CPC .................................................. H04L 41/0806
See application file for complete search history.

(56) References Cited

U.S. PATENT DOCUMENTS

| | | | |
|---|---|---|---|
| 2007/0177597 A1* | 8/2007 | Ju | H04L 12/4641 370/392 |
| 2009/0034413 A1* | 2/2009 | Sajassi | H04L 12/1863 370/228 |
| 2009/0067437 A1* | 3/2009 | Krishnan | H04L 12/2856 370/395.53 |
| 2010/0083245 A1* | 4/2010 | Dehaan | G06F 9/4411 717/177 |
| 2012/0093508 A1* | 4/2012 | Baykal | H04L 12/2881 398/58 |
| 2012/0170465 A1* | 7/2012 | Spieser | H04L 12/2697 370/249 |
| 2012/0176890 A1* | 7/2012 | Balus | H04L 12/4641 370/218 |
| 2016/0050119 A1* | 2/2016 | Chhabra | H04L 43/0811 370/218 |
| 2016/0112242 A1* | 4/2016 | Chanukaev | H04L 12/2859 709/226 |

* cited by examiner

*Primary Examiner* — Albert T Chou
(74) *Attorney, Agent, or Firm* — David L. Soltz

(57) ABSTRACT

A centralized network administrator may automatically provision an Ethernet circuit between network elements by storing and managing circuit data (managed objects) in one of the network elements (master node) and synchronizing the circuit data among the network nodes in the Ethernet circuit path. In addition, multiple network administrators may provision multiple Ethernet circuits using the overlapping network elements by managing access to the circuit data in the Master node.

20 Claims, 10 Drawing Sheets

SYSTEMS AND METHODS FOR PROVISIONING ETHERNET SERVICES

FIELD OF DISCLOSURE

This disclosure relates generally to a communication network and more specifically, but not exclusively, to provisioning Ethernet services over a communication network.

BACKGROUND

Ethernet has a long history. It has become dominant in enterprise networks. This dominance has led to high production-volume components, which in turn have allowed extremely low cost per bit. Likewise Ethernet has a long history of re-inventing itself. From the original copper coaxial cable format ("thicknet") it has extended its scope to nearly all copper, optical fiber and wireless physical media. Bit rates have continued to increase, traditionally growing tenfold each time a new rate is defined. Gigabit Ethernet interfaces are widely deployed in PCs and servers, and 10 Gbit/s in local area network (LAN) backbones. Rates up to 100 Gigabit Ethernet were standardized in 2010 and 2011. Ethernet's dominance is partly attributed to the simple advantages for the industry of adopting a single standard to drive up volumes and drive down prices. In part, it is also due to ease of deployment, using its ability to self-configure based on the key concepts of "learning bridge" (flooding, and associating learned destination addresses with bridge ports) and "spanning tree protocol" (the protocol used for avoiding bridging loops).

Ethernet is a fairly simple protocol which has scaled to hundreds of thousands of times faster speeds and consistently been able to adapt to meet the needs and demands of new markets. For example, time domain capabilities are being added to IEEE 802.3 Ethernet to support IEEE 802.1 Audio Video Bridging (AVB), and these capabilities will be applicable to time sensitive carrier applications likewise IEEE 1588. Customer LAN networks are increasingly connected to wide-area telecommunications networks over Ethernet interfaces or to devices that bridge digital subscriber line (DSL) or wireless to these. Moreover, customers are familiar with the capabilities of Ethernet networks, and would like to extend these capabilities to multi-site networks. Meanwhile the needs of such networks have expanded to include many services previously handled only on the LAN or by specialized connections, notably video and backup.

Ethernet as a service (EaaS) is the use of high-bandwidth, fiber optic media such as Packet over SONET (PoS) to deliver 10 Mbps, 100 Mbps or even 1000 Mbps Ethernet service to one or more customers across a common bidirectional broadband infrastructure. Ethernet, a networking technology defined in IEEE 802.3 and related specifications, is best understood as a carrier sense multiple access/collision detect (CSMA/CD) form of baseband networking. The service arrives to the recipient via a broadband channel that it must accommodate, manage, and service within its overall infrastructure. Key concerns for implementation include careful provision and management of bandwidth so that one user's consumption of best-effort Internet services and high-bandwidth realtime services (such as voice, video on demand, or streaming media) does not lead to resource contention or performance or stability problems. Most carriers address these issues by designing their infrastructure to support multiple Ethernet overlays across a shared optical layer that uses wavelength division multiplexing (WDM) or dense wavelength division multiplexing (DWDM) to accommodate the load and to achieve appropriate economies of scale and cost per bit of communications.

However, provisioning Ethernet services, for example an E-LAN service, requires programming many network elements. An E-LAN service with 50 endpoints requires programming 50 network elements, for example. In each network element, multiple entities need to be programmed in a specific sequence when the Ethernet service is provisioned. Configuration of each entity across multiple network elements is needed to achieve correct packet flows for the Ethernet service. Some equipment vendors offer TL1 and device specific user interfaces to aid programming Ethernet service specific entities. Using these interfaces, users have to manually program each network element, program entities in a specific order, and ensure consistency across network elements. This process is tedious and error prone. In fact, most products offer management interfaces such as CLI or some graphical interface but it is limited to programming one network element. Users have to do the heavy lifting of programming many network elements in a consistent manner.

Accordingly, there is a need for systems, apparatus, and methods that improve upon conventional approaches including the improved methods, system and apparatus provided hereby.

SUMMARY

The following presents a simplified summary relating to one or more aspects and/or examples associated with the apparatus and methods disclosed herein. As such, the following summary should not be considered an extensive overview relating to all contemplated aspects and/or examples, nor should the following summary be regarded to identify key or critical elements relating to all contemplated aspects and/or examples or to delineate the scope associated with any particular aspect and/or example. Accordingly, the following summary has the sole purpose to present certain concepts relating to one or more aspects and/or examples relating to the apparatus and methods disclosed herein in a simplified form to precede the detailed description presented below.

In one aspect, a method for provisioning an Ethernet connection by a controller between a first device and a second device in a communication network includes: receiving, by a first controller, a first request for an Ethernet connection between a first device in a network and a second device in the network; selecting the first device as a master; sending, by the first controller, a first command to the first device, the first command instructing the first device to temporarily decline simultaneous requests from other controllers for the Ethernet connection; sending first connection data to the first device, the first connection data identifying the first device as a first end point of the Ethernet connection and the second device as a second end point of the Ethernet connection; sending second connection data to the first device, the second connection data identifying attributes of the Ethernet connection; sending third connection data to the second device, the third connection data identifying the attributes of the Ethernet connection; sending a second command to the first device, the second command instructing the first device to stop declining the simultaneous requests from other controllers for the Ethernet connection; and sending data from the first device to the second device over the Ethernet connection.

In another aspect, an apparatus includes: means for receiving a first request for an Ethernet connection between a first device in a network and a second device in the network; means for selecting the first device as a master; means for sending a first command to the first device, the first command instructing the first device to temporarily decline simultaneous requests from other controllers for the Ethernet connection; means for sending first connection data to the first device, the first connection data identifying the first device as a first end point of the Ethernet connection and the second device as a second end point of the Ethernet connection; means for sending second connection data to the first device, the second connection data identifying attributes of the Ethernet connection; means for sending third connection data to the second device, the third connection data identifying the attributes of the Ethernet connection; means for sending a second command to the first device, the second command instructing the first device to stop declining the simultaneous requests from other controllers for the Ethernet connection; and means for sending data from the first device to the second device over the Ethernet connection.

In still another aspect, a non-transient computer readable medium containing program instructions for causing a processor to perform a process including: receiving, by a first controller, a first request for an Ethernet connection between a first device in a network and a second device in the network; selecting the first device as a master; sending, by the first controller, a first command to the first device, the first command instructing the first device to temporarily decline simultaneous requests from other controllers for the Ethernet connection; sending first connection data to the first device, the first connection data identifying the first device as a first end point of the Ethernet connection and the second device as a second end point of the Ethernet connection; sending second connection data to the first device, the second connection data identifying attributes of the Ethernet connection; sending third connection data to the second device, the third connection data identifying the attributes of the Ethernet connection; sending a second command to the first device, the second command instructing the first device to stop declining the simultaneous requests from other controllers for the Ethernet connection; and sending data from the first device to the second device over the Ethernet connection.

Other features and advantages associated with the apparatus and methods disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

Figure 1:
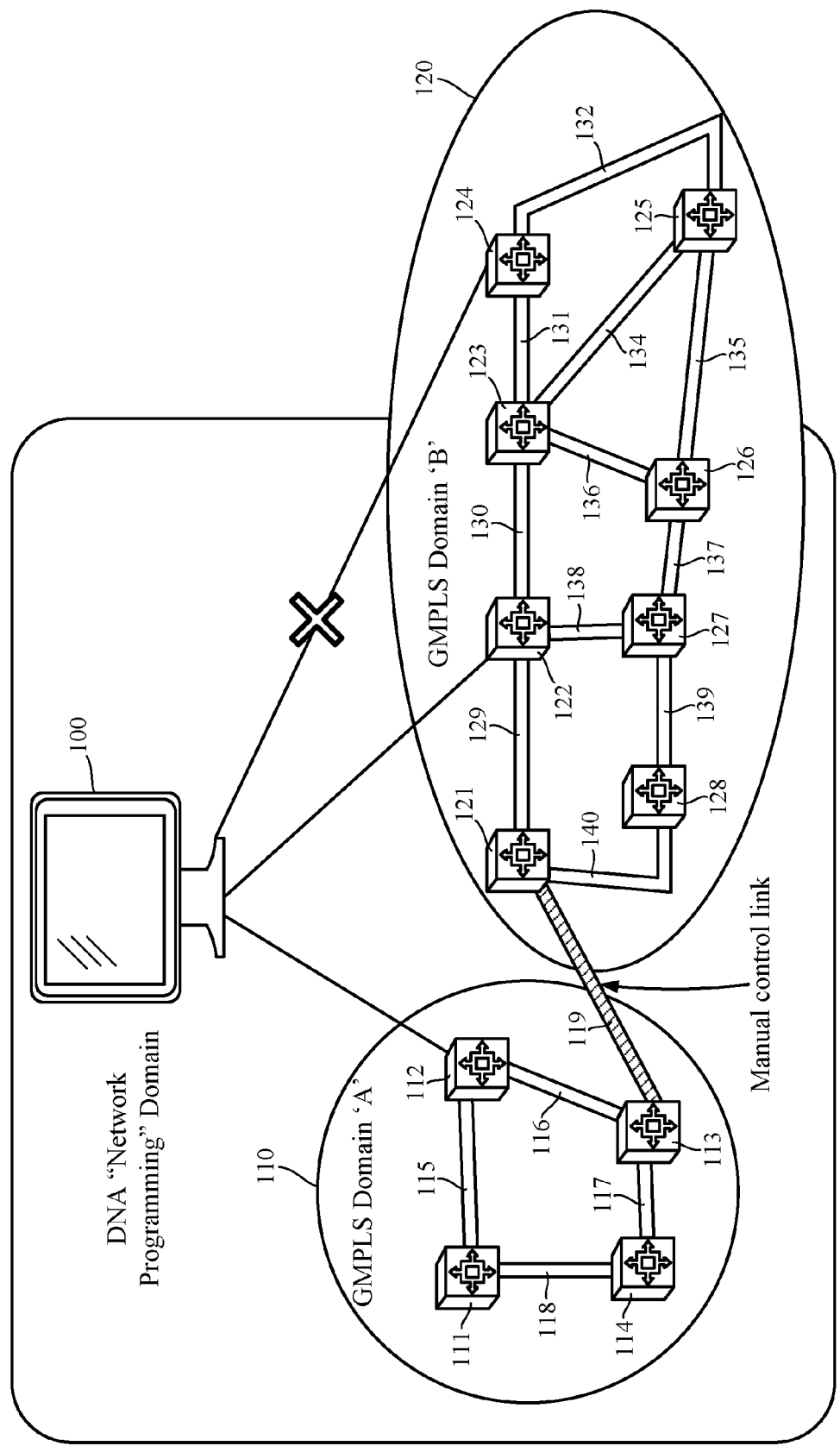
FIG. 1 illustrates an exemplary controller in accordance with some examples of the disclosure.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

The exemplary methods, apparatus, and systems disclosed herein advantageously address the industry needs, as well as other previously unidentified needs, and mitigate shortcomings of the conventional methods, apparatus, and systems. New methods and systems are described herein for provisioning end-to-end Ethernet services that involve programming (configuring) networking elements participating in an Ethernet service, ensuring data consistency across the network, handling partial configuration failures and communicating to a user regarding the overall service state across the network. For example, a controller (e.g. a digital network administrator—DNA) may provide an interface that supports automated end-to-end provisioning of Ethernet services (network programming), which involves additional capabilities that provide an end user experience similar to that of provisioning an Optical Transport Network (e.g. OTN in compliance with ITU-T G.709) or sub-network connection (SNC) using GMPLS control plane. In one example, a centralized controller may automatically provision an Ethernet circuit between network elements by storing and managing circuit data (managed objects) in one of the network elements (master node) and synchronizing the circuit data among the network elements in the Ethernet circuit path. In addition, multiple controllers may provision multiple Ethernet circuits using the overlapping network elements by managing access to the circuit data in the Master node.

In one configuration, a controller (e.g. a digital network administrator—DNA) may be used to orchestrate Ethernet service programming across a plurality of network elements, with network programming spanning multiple Generalized Multiprotocol Label Switching (GMPLS) domains. FIG. 1 illustrates an exemplary controller in accordance with some examples of the disclosure. As shown in FIG. 1, a controller or server (e.g. DNA) 100 configured to perform Ethernet service provisioning may include a first network domain 110 and a second network domain 120. The first domain 110 may include a plurality of network elements 111, 112, 113, and 114 interconnected by a series of connections or links 115, 116, 117, and 118 along with a manual control link 119 between the first domain 110 and the second domain 120. The second domain 120 may include a plurality of network elements 121-128 interconnected by a series of connections or links 129-140. The DNA 100 may be directly connected to a network element in each domain, such as network element 112 of the first domain 110 and network element 122 of the second domain 120 accessible to the DNA 100 user with provisioning privileges. The DNA 100 may support end-to-end Ethernet service provisioning with all endpoints in a single domain (e.g. GMPLS domain 110 or GMPLS domain 120) as well as Ethernet service across multiple domains such as 110 and 120 connected by a manual control link 119. The DNA 100 may support end-to-end Ethernet service provisioning with endpoints in multiple domains that may be traced through a manual control link, such as link 119. While FIG. 1 illustrates GMPLS domains, it should be understood that the DNA 100 is not limited to GMPLS type domains. The DNA may be configured to manage multiple domains (110 and 120) while supporting modeling connectivity between the multiple domains 110 and 120 via the manual control link 119. Many DNA applications, such as CDM, may use this manual control link 119 for tracing across domains 110 and 120. Conversely, DNA network programming domain (e.g the DNA server 100, domain 110 and domain 120) may not include all nodes or network elements in a domain. For example, as shown in FIG. 1, network element 124 in domain 120 is unmanaged by the DNA 100. The DNA 100 may be configured to store and manage user supplied service configuration data by, for example, storing data in one of the network elements 112 or 122 as a DNA managed object.

Figure 2A:
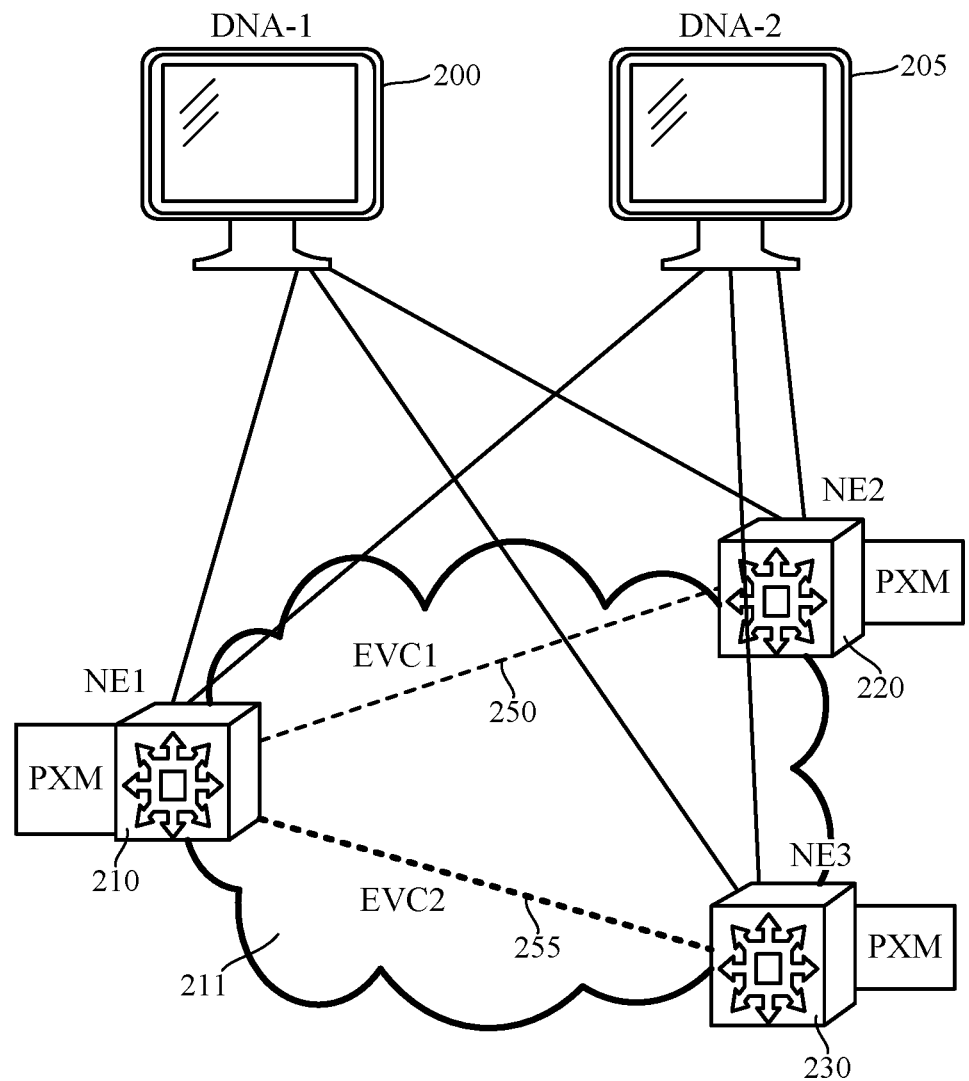
FIGS. 2A and 2B illustrate exemplary controllers managing the same network in accordance with some examples of the disclosure.

FIG. 2A illustrates exemplary controllers managing the same network in accordance with some examples of the disclosure. As shown in FIG. 2A, a first DNA 200 is directly connected to a first network element 210 of a first domain 211, a second network element 220, and a third network element 230. A second DNA 205 is also directly connected to the first network element 210, the second network element 220, and the third network element 230. Thus, both the first DNA 200 and the second DNA 205 may access and manage the same network 211. However, unlike traditional management systems, the first DNA 200 and the second DNA 205 do not communicate with each other. Each DNA server 200 or 205 instance derives a network state from the configuration data from each network element 210-230. This is referred as network-is-the-master model. Hence, end-to-end Ethernet service data and also transaction information is stored in a network element in order to correctly handle use cases when both DNAs are attempting to manage the same Ethernet service. As shown, a first Ethernet virtual connection (EVC1) 250 may be provisioned between the first network element 210 and the second network element 222 while a second Ethernet virtual connection (EVC2) 255 may be provisioned between the first network element 210 and the third network element 230.

Figure 2B:
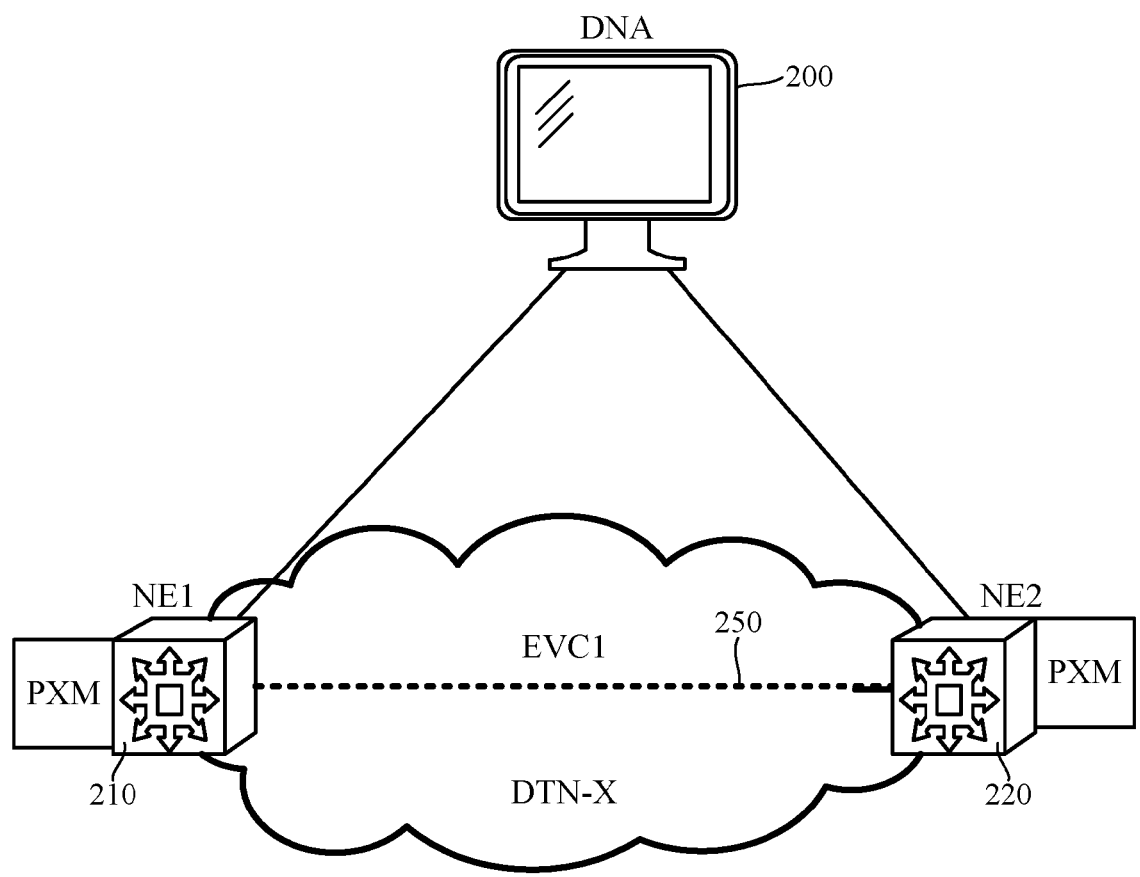
Figure 3:
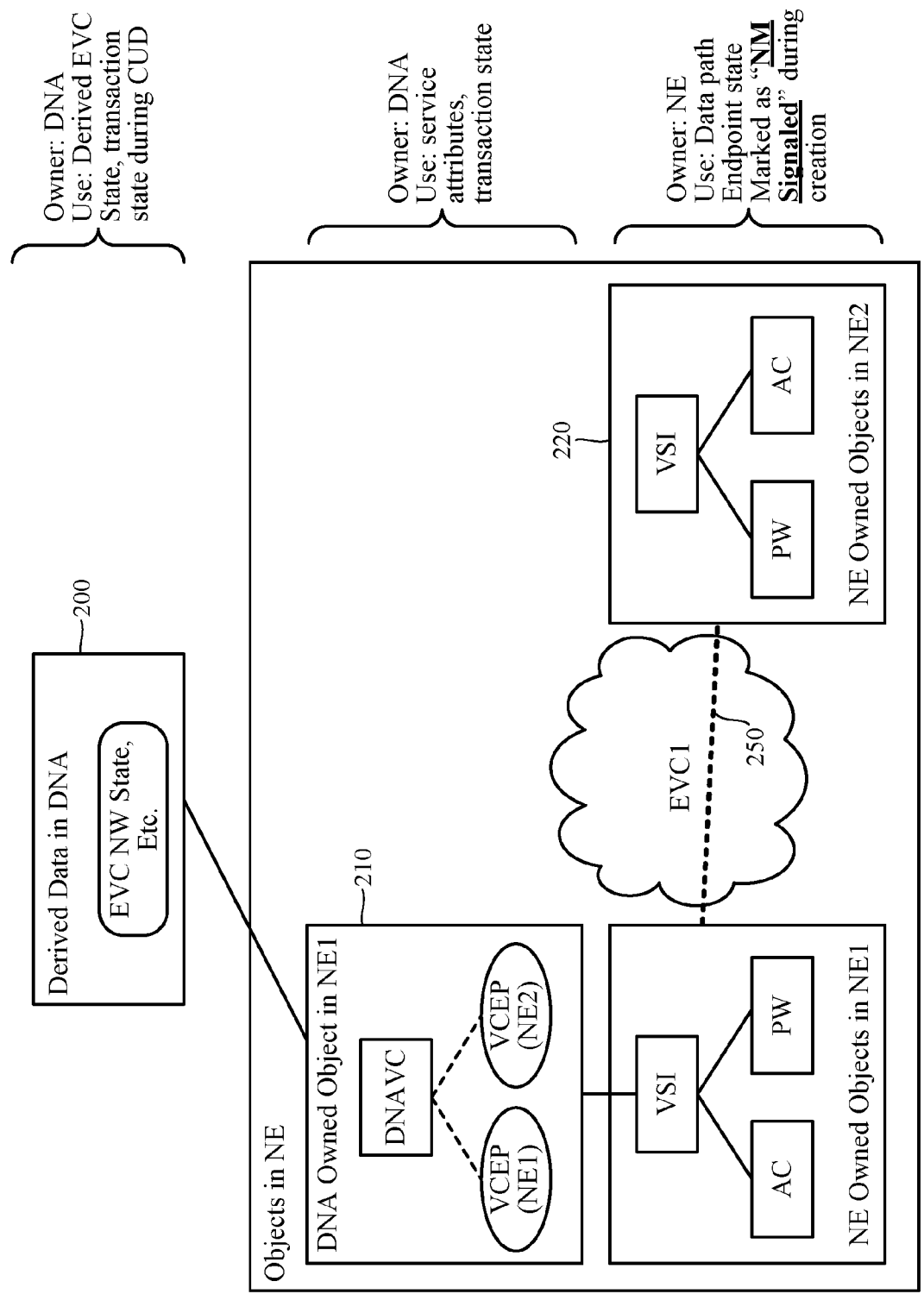
FIG. 3 illustrates an informational model for the example network in accordance with some examples of the disclosure.

FIG. 2B illustrates an example network while FIG. 3 illustrates an informational model for the example network. As shown in FIG. 2B, a first DNA 200 maintains end-to-end Ethernet service configuration and transaction state in managed objects stored in a network element (NE); the network element acts as the shared database for multiple DNA server instances. These managed objects are transparent to NE except in certain circumstances based on specific requirements. These may be referred to as DNA owned objects herein. In one example, multiple DNAs do not communicate with each other. Instead, their synchronization is indirectly achieved by synching the same data from the network (e.g. Network-is-the-master).

As shown in FIG. 3, synchronization across network elements may be achieved using a centralized DNA interface component of DNA 200 is accessible to the user and configured to synchronize transactions or updates to managed objects 210 stored in the NEs. When a configuration change requires updates across a number of devices, the centralized DNA interface component provides the required transaction semantics using sufficient primitives upon which transaction-oriented operations can be built. Providing complete transactional semantics across multiple devices may reduce the size and number of windows for failure scenarios. There are two classes of multi-device operations. The first class allows the operation to fail on individual devices without requiring all devices to revert to their original state. The operation can be retried at a later time, or its failure simply reported to the user. For this class of operations, failure avoidance and recovery are focused on the individual device. This means recovery of the device, reporting the failure, and perhaps scheduling another attempt. The second class is more interesting, requiring that the operations should complete on all devices or be fully reversed. The network should either be transformed into a new state or be reset to its original state. Leaving the network in a state where only a portion of the devices have been updated with the new definition will lead to future failures when the definition is referenced.

Figure 4:
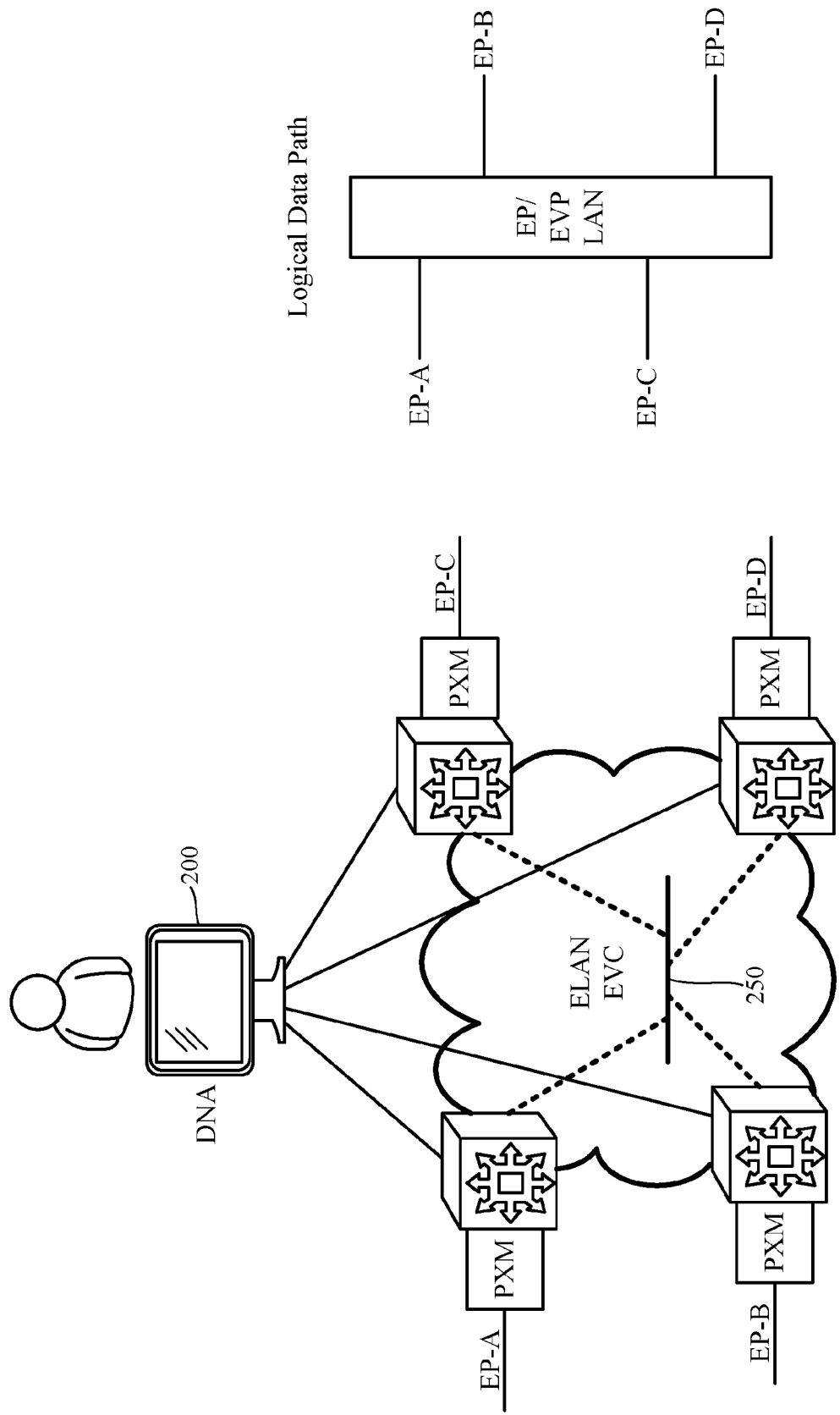
FIG. 4 illustrates an E-LAN circuit in accordance with some examples of the disclosure.
Figure 5:
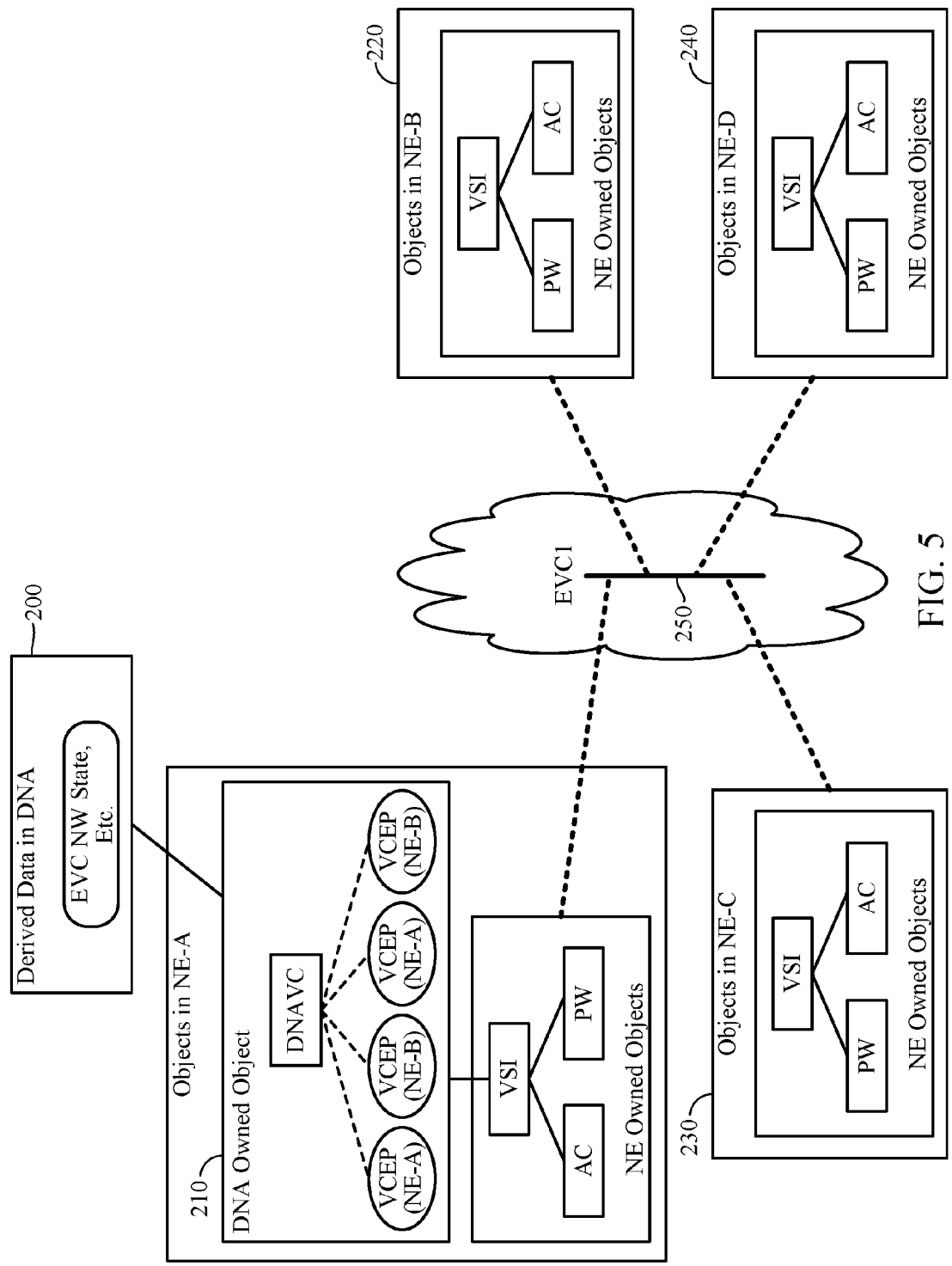
FIG. 5 illustrates a controller information model in accordance with some examples of the disclosure.

FIG. 4 illustrates a DNA 200 and a sample E-LAN EVC 250. FIG. 5 illustrates a corresponding DNA owned information model for DNA 200 and EVC 250. As shown, DNA 200 may store the endpoint specific attribute values of each endpoint of an E-LAN circuit 250. In this example, there are four endpoints with corresponding virtual circuit managed object instances, a first NE 210, a second NE 220, a third NE 230, and a fourth NE 240. DNA 200 may create and manage objects that store Ethernet service configuration data and transaction states in network elements 210-240. DNA 200 owned managed object information model may be as specified by the user. As illustrated in FIG. 3, DNA 200 may store service specific configuration data and endpoint specific data for each endpoint participating in a service at one endpoint node while other endpoint nodes have only the data path related objects. For example, in FIG. 3, NE 210 has endpoint specific data for both endpoints while NE 220 has only the NE owned data path specific managed objects.

DNA and the DNA interface component data path objects manual versus network managed signaled. As described herein, users may create an Ethernet service manually by creating individual data path objects in each network element. The DNA interface component marks the CreationType of those data path objects (e.g. attachment circuit (AC), virtual switching instance (VSI) and pseudowire (PW)) as manual. The data path objects created by DNA via end-to-end service provisioning may be marked with CreationType as NM Signaled. The DNA may edit operations on NM Signaled data path objects and the DNA may ensure that NM Signaled data path objects are not modified individually through manual programming. These objects may be editable only through editing end-to-end Ethernet service via network programming described below. Note that the DNA interface component also denies any manual edits to these objects via other methods, such as TL1 except for some attributes.

Figure 6:
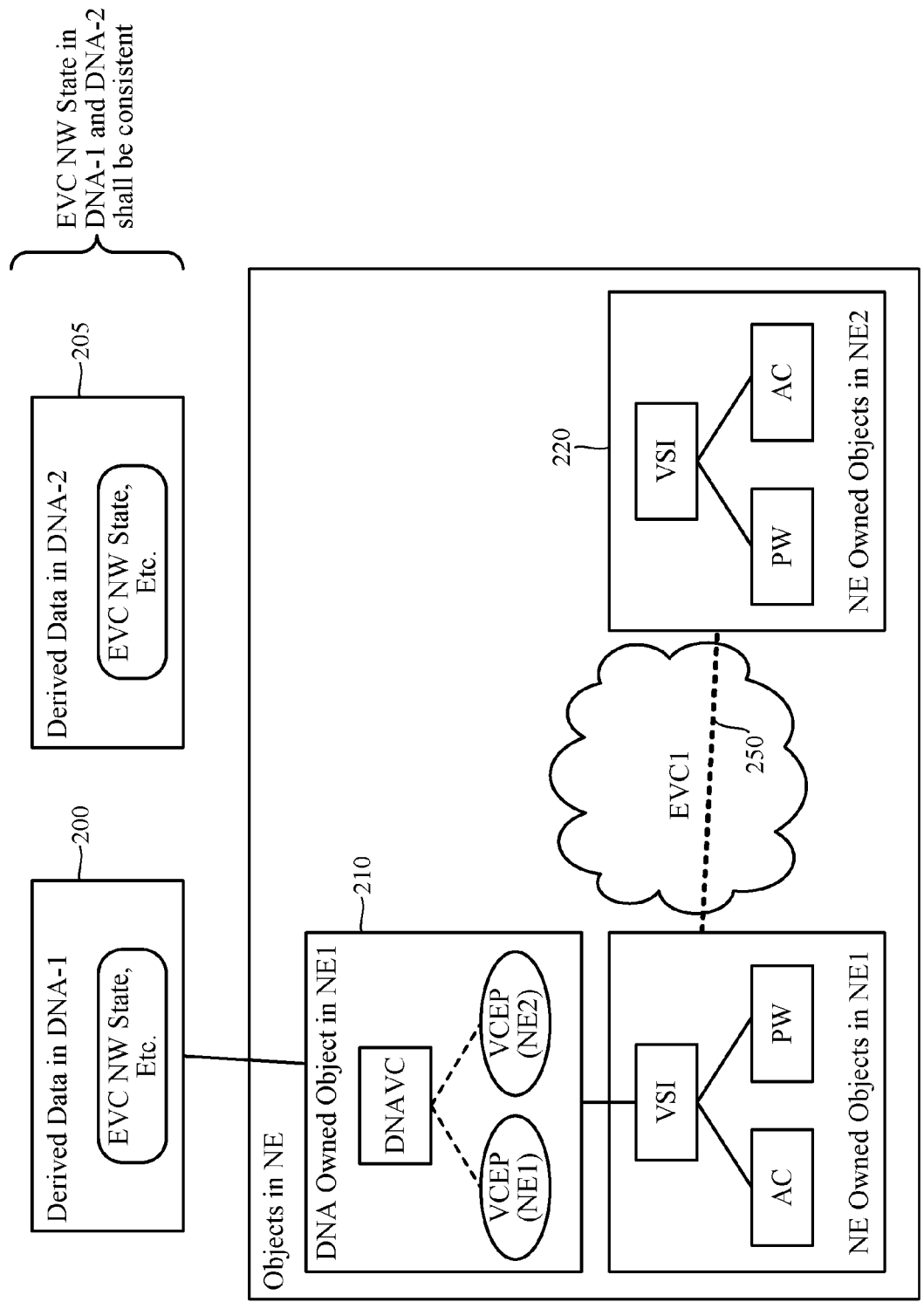
FIG. 6 illustrates multiple controller information model in accordance with some examples of the disclosure.

FIG. 6 illustrates a multiple network administrator information model in accordance with some examples of the disclosure. As illustrated in FIG. 2A, multiple DNA server instances do not communicate with each other, instead they rely on data stored in network elements. Hence, as illustrated in FIG. 6, multiple DNA instances 200 and 205 would be managing the same managed objects. Secondly, a single operation on an Ethernet service involves programming (configuring) multiple network elements 210 and 220. Hence, without proper transaction semantics, multiple DNA instances may interfere with each other, which could result in an inconsistent service state in the network. The DNA interface component addresses these issues by specifying primitives to be supported by each device (network element) so that management applications can perform multi-network element operations with fewer failure scenarios and narrow failure window.

For example, consider a scenario for the sample network illustrated in FIG. 6. Assume CE-VLAN Preservation=TRUE for EVC1. User-A initiates an edit operation on EVC1 via DNA-1 to modify the Match VLAN ID from 100 to 200. This results in DNA-1 editing AC object in NE1 and AC object in NE2. Assume DNA-1 sends the edit request to NE1 AC managed object (MO) and then to NE2 AC MO. At the same time assume User-2 initiates another edit operation via DNA-2 to modify the Match VLAN ID from 100 to 300. Assume DNA-2 sends this edit request to NE2 first and then to NE1. Depending on the sequence of edit requests from DNA-1 and DNA2, it is possible that Match VLAN ID in NE1 is set to 200 while the Match VLAN ID in NE2 is set to 300 resulting in an inconsistent state. Hence, before performing any edit operation each DNA 200 and 205 must lock a service so that only one DNA instance is actively editing at any given time. However, neither NE 210 nor NE 220 implements the Lock/Unlock semantics. These semantics are implemented in DNA 200 or 205 by creating an object called a DNA Lock. Since the DNA interface component allows only one DNA instance to create one Lock object with the same MO identification, only one DNA server instance is granted the Lock request.

In addition, DNA Lock requests from multiple DNA instances need to be serialized. For example, in FIG. 6 the Lock mechanism is useless if DNA-1 acquires the Lock to EVC1 from NE1 while DNA-2 acquires the Lock to same EVC from NE2. DNA 200 or 205 may achieve this serialization by designating one of the endpoints as Master. For any DNA instance to perform an operation on an Ethernet service, it must first acquire Lock from the Master endpoint.

DNA—Selection of Master endpoint for Ethernet Private line (EP-Line or EPL) and Ethernet Virtual Private Line (EVP-Line or EVPL) services and Ethernet Private Local Area Network (EPLAN) and Ethernet Virtual Private Local Area Network EVP-LAN services. The DNA may auto-select the Master endpoint for an EPL and EVPL (point to point) services at the time of service creation. For an inter-node Ethernet service, Master endpoint may be the node with lowest node ID. For an intra-node Ethernet service, an endpoint with lower Ethernet Interface ID may be the Master endpoint. This requirement is applicable to EP-LAN and EVP-LAN services also. The Master endpoint is selected based on the node ID at the time of EVC creation. When other endpoints are added/deleted, the node ID rule may not be valid. For an E-LAN service, users can add and delete endpoints of an existing E-LAN service. It is possible that a user may need to delete all endpoints of a master node. In that scenario, DNA VC MO objects need to be migrated to another node that has the endpoints.

DNA—Master endpoint migration for EP-LAN and EVP-LAN services. When a user deletes all endpoints of an E-LAN service in the Master endpoint node, the DNA may migrate the DNA MO to another node with an endpoint by creating a new MO and deleting the MO in the old node. DNA may perform this operation as part of the endpoint delete operation and hence it may be transparent to the user.

In one method, the DNA may not allow the user to delete the Master endpoint. As specified above, the DNA needs to auto-select the Master endpoint so that it is deterministic. For example, assume User1 initiates EVC1 250 creation through DNA1 200 between two endpoints NE-A 210 and NE-B 220. Assume that, at the same time User2 initiates EVC1 250 creation through DNA2 205 between the same two endpoints NE-A 210 and NE-B 220. In this case, it is not desirable for DNA1 200 to start EVC1 250 creation in NE-A 210 and then NE-B 220 and DNA2 205 to start EVC1 250 creation in NE-B 220 and then NE-A 210. It is desirable for only one user attempt to go through. To achieve this, both DNAs 200 and 205 need to select the same endpoint as Master and request for Create Lock for EVC1 250 from that endpoint node only. With this, only one DNA will get the Lock and will proceed with creation while the remaining DNA instances give proper error messages to the user.

DNA Lock and Unlock Operations: Lock and Unlock mechanisms described herein ensure that only one DNA is performing an operation at any given time. The DNA must acquire a Lock to perform Create, Edit and Delete operations on a given EVC. The DNA interface component may support Lock semantics, instead a DNA may use the operations currently supported by the DNA interface component to create the Lock semantics. The DNA interface component may support a new managed object called VCMOLOCK. The DNA may utilize Lock/Unlock operations prior to addition/deletion of endpoints to an E-LAN service.

DNA—acquire Lock: the DNA may request a Lock of an Ethernet service by creating a VCMOLOCK object. The association identification (AID) of this object may contain the EVCID and Ethernet Interface ID terminating the service on that node. Successful creation of VCMOLOCK object indicates successful Lock response. If the DNA interface component rejects object creation, then the DNA may interpret that as Lock request rejection.

DNA—release Lock: the DNA may release the Lock of an Ethernet service by deleting a VCMOLOCK object. The AID of this object may contain the EVCID and Ethernet Interface ID terminating the service on that node. Successful deletion of an object indicates the successful Lock release. DNA may retry deletion of the Lock object until it is successful or the DNA interface component responds with object does not exist.

Figure 7:
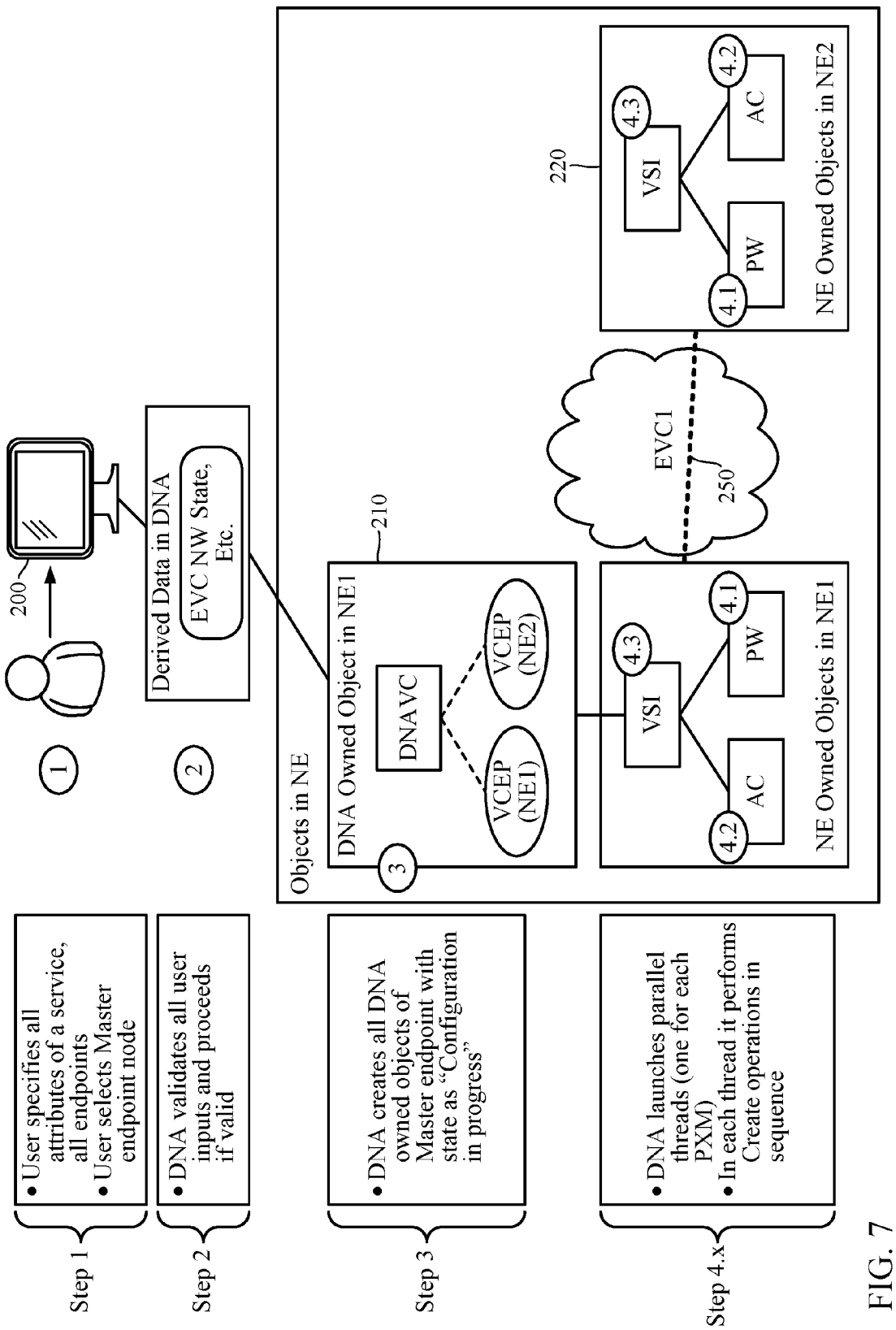
FIG. 7 illustrates a creation sequence in accordance with some examples of the disclosure.

FIG. 7 illustrates a creation sequence in accordance with some examples of the disclosure. The DNA workflow through which user provides all attributes of an Ethernet service are illustrated. For example, once the user provided data is validated, the DNA configures necessary managed objects in each network element in order to create, edit and delete an end-to-end Ethernet service.

DNA—initiate creation of new Ethernet service: the DNA may initiate new Ethernet service creation only after user provides the complete specification of an Ethernet service and data is validated as described.

DNA—Inter-node Ethernet service creation sequence: the DNA may create Ethernet service by initiating multiple operations at each endpoint network element. The DNA may wait for successful completion of each operation. If any of the operations fail, the DNA may do a failure recovery. Failure recovery could be retry or simple abort. Following sequence describes the simple case. FIG. 7 illustrates a high level creation sequence.

1. Designate one of the endpoints in an EPL/EP-LAN and EVPL/EVP-LAN service as a Master endpoint.

2. Request for new VCMOLOCK object creation in Master endpoint node. The AID of the object may be "Ethernet Interface ID of the Master endpoint % EVCID provided by the user". Wait for successful creation of VCMOLOCK object.
  a. If VCMOLOCK object creation fails, then give an error message to the user. User can go back in the workflow to edit EVC ID to continue.
    i. Error message may be "<EVC ID given by the user> cannot be created because it either already exists or another creation in progress. To continue, select a new EVC ID."
  b. If VCMOLOCK object is created, then continue with the remaining steps below.
3. Create DNA owned VCMO and VCEP objects in Master endpoint. Wait for successful creation of these objects.
  a. If creation of any of these objects fail abort Ethernet service creation with complete rollback. In other words, at this step, DNA may release VCMOLOCK object created in previous step.
  b. If all objects are created successfully, continue.
4. Initiate creation of AC, PW and VSI objects in each endpoint node. Wait for successful creation of all these objects.
  a. If any of the object creation fails for whatever reason, abort Ethernet service creation with full rollback. That is delete successful creation of objects in previous steps.
  b. If all objects are created successfully, continue.
5. Delete VCMOLOCK object created in previous step. Wait until object is deleted.
  a. If object deletion fails, retry until it is successful or the DNA interface component reports that the object does not exist.
6. Once VCMOLOCK object deletion is successful, display a message to the user to indicate successful creation of Ethernet service and exit the creation process.
7. DNA may log sufficient events for user to debug in case of errors. Event may be logged on VC MO if the object exists, if not, it may be logged as a DNA event (source object as EMS).

DNA—Create Transaction state: the DNA may main transaction state at each step in the sequence. These transaction states may be displayed to the user. For example, another DNA instance may retrieve data from NE when DNA1 is in the middle of creation. At a high level, the transaction state may indicate "Creation In Progress" or "Creation Successful". The transaction state may be supported for each endpoint to capture the endpoint creation process. It is extended to an E-LAN service when an endpoint is added or deleted. The transaction state may be supported at EVC level to capture the overall EVC creation process. EVC transaction state may be extended to include the addition and deletion of endpoint steps to an ELAN service. It is possible that at any one instance, there could be an endpoint which is being deleted while another endpoint could be added. It is acceptable additional transaction states for addition and deletion endpoint process is added to EVC MO.

Creation failure could be caused by many reasons. For example DNA may lose connectivity to NE when it is in the middle of creation. NE may reject creation due to insufficient resources or may be even invalid request (DNA validation may not be up-to-date with NE validations).

DNA—Creation sequence stop-on failure: The DNA may abort Ethernet service creation if any of the operation fails. In addition, DNA may delete the objects that are created in previous steps and ensure that there are no stale objects in NE.

DNA—Creation sequence retry on failure: It is desirable for DNA retry failed operations for some number of times before aborting service creation. If retries fail, then DNA may abort creation as described.

DNA may fail when it is in the middle of creation. For example, server crashes. When this happens, there will be objects created in partial state in the NEs. It is possible that another DNA instance may come up and read this partial Ethernet service. With this, it is the user's responsibility to clean up the partially created objects by force deleting them.
  A given transaction is completed by only one DNA
    For example if DNA-1 starts an edit operation on an EVC, only that DNA can complete that operation
    This may lead to inconsistent state if DNA-1 dies in the middle of an operation
    In such a state, user can Force Delete and clean up partial objects
  In future, DNA can implement advanced mechanisms like Steal Lock to recover and complete an operation DNA—Intra-node, inter-NE programming module Ethernet service creation sequence: Intra-node, inter-NE programming module Ethernet service has both endpoints in the same network element. In this scenario, DNA needs to create only one set of VC objects, as Master endpoint, in the network element. Sequence of creation may be limited to the objects illustrated in FIG. 8.

Figure 8:
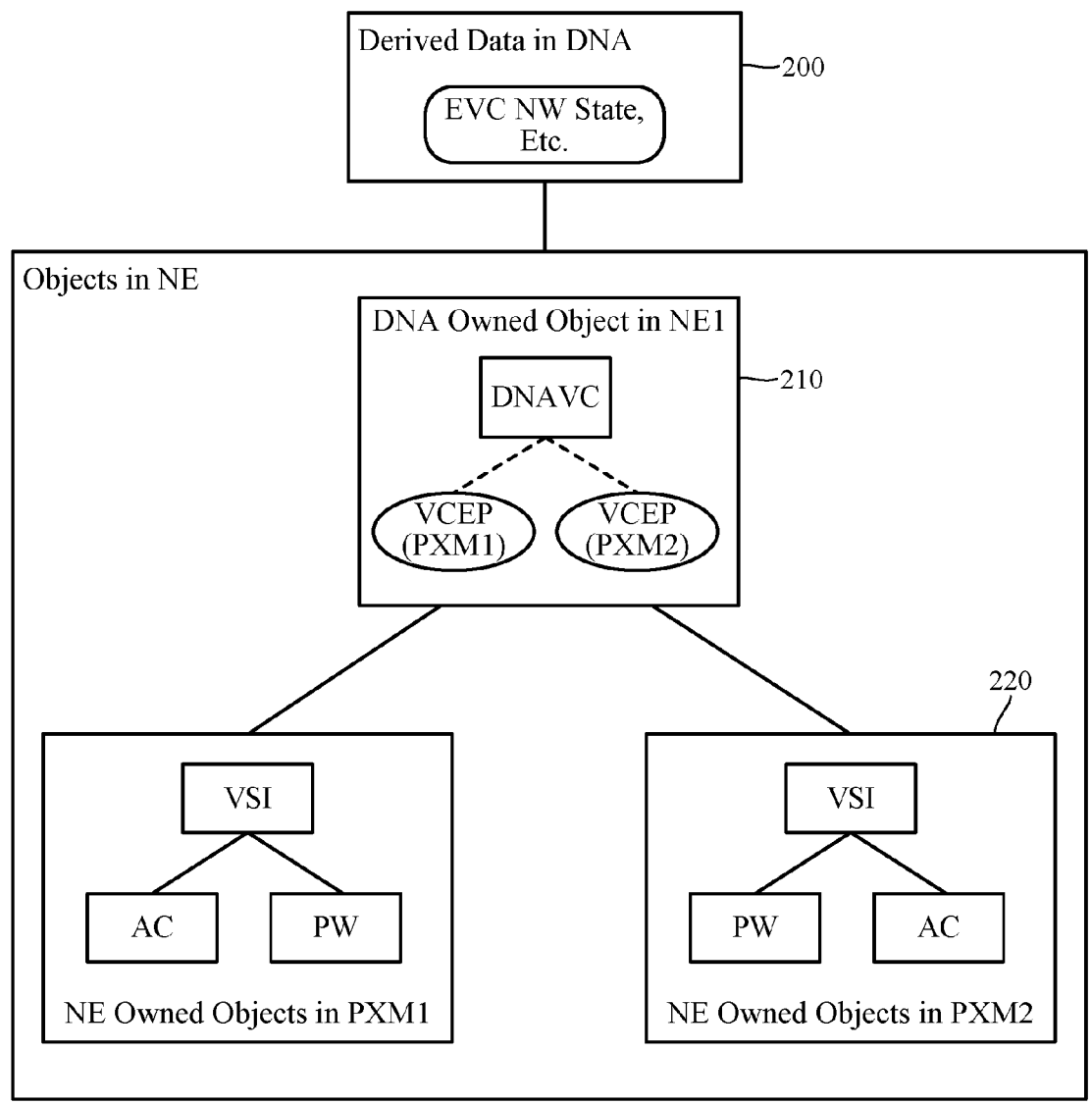
FIG. 8 illustrates a controller service object model in accordance with some examples of the disclosure.
Figure 9:
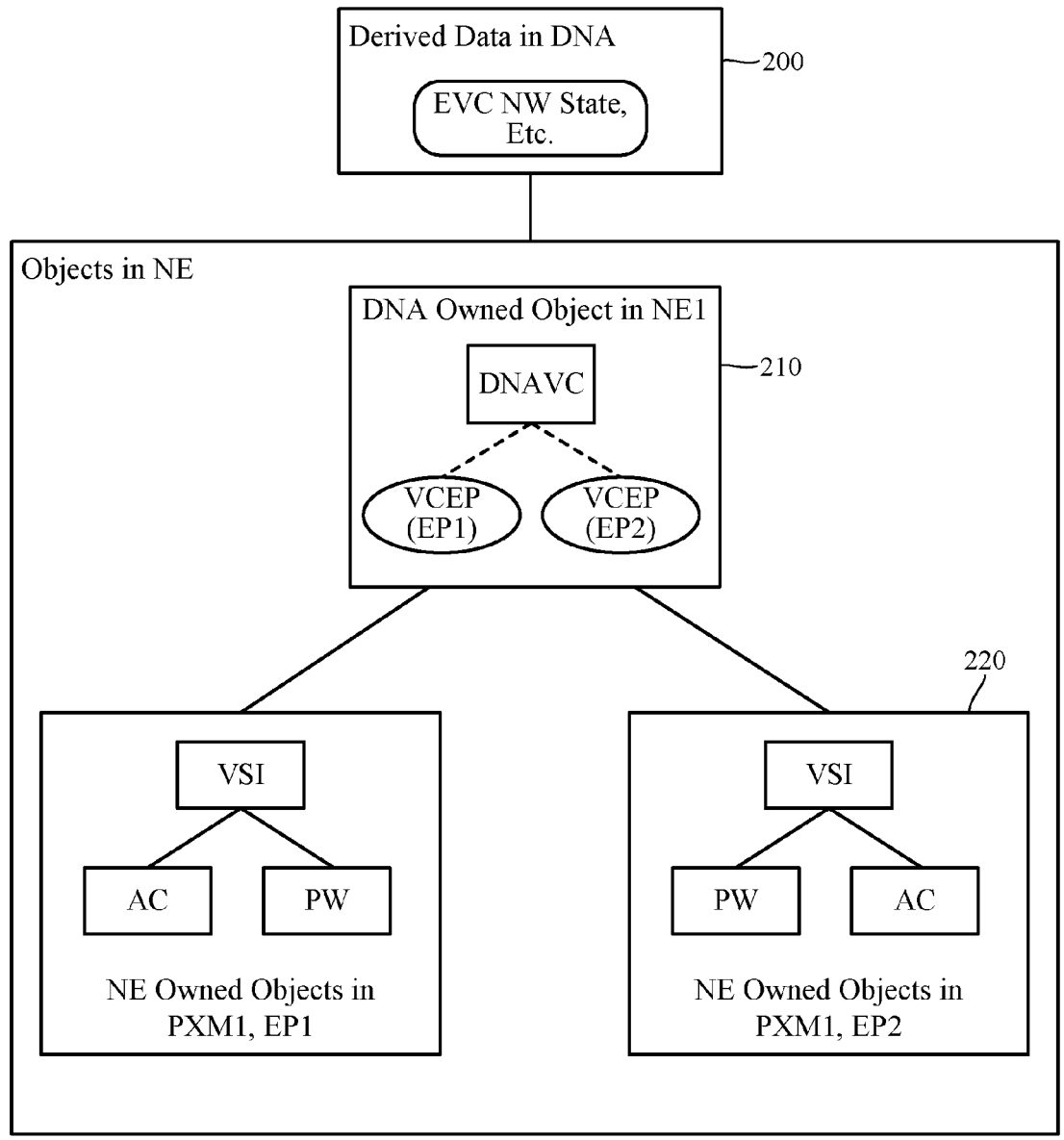
FIG. 9 illustrates a controller service object model in accordance with some examples of the disclosure.

FIG. 8 illustrates a network administrator service object model in accordance with some examples of the disclosure. DNA—Intra-node, intra-NE programming module Ethernet service creation sequence: Intra-node, intra-NE programming module Ethernet service has both endpoints in the same NE programming module. Switching between two endpoints in the same NE programming module is done at Ethernet layer only. In this scenario, DNA needs to create only one set of VC objects, as Master endpoint, in the network element. Sequence of creation may be limited to the objects illustrated in FIG. 9. FIG. 9 illustrates a network administrator service object model in accordance with some examples of the disclosure. As described, most of the attributes can be edited only in Admin Lock state or Admin Maintenance state. Significance of Admin state is to indicate potential impact to data service during edit operation. A DNA user can edit the end-to-end service at any time. However, DNA may perform multiple operations on each endpoint including Admin state Lock or Admin state Maintenance on NE data path objects.

DNA—initiate Edit operation on an Ethernet service: DNA may initiate edit/modification to an Ethernet service only after user provides the complete specification. Sequence of operations may be as follows:
1. Request for new VCMOLOCK object creation in Master endpoint node. The AID of the object may be "Ethernet Interface ID of the Master endpoint % EVCID of the Ethernet service to be modified". Wait for successful creation of VCMOLOCK object.
  a. If VCMOLOCK object creation fails, then give an error message to the user specified below.
    i. Error message may be "<EVC ID of the service to be edited> cannot be edited at this time, retry later."
  b. If VCMOLOCK object is created, then continue with the remaining steps below.
2. Copy the existing values of attributes to be modified in its local memory. This is needed in order to roll back edit operation on failure.

3. Update attributes of DNA owned VCMO and VCEP objects in Master endpoint.
   a. If edits to any of these objects fail, abort Ethernet service edit operation and perform error recovery as described below.
   b. If all edit operations are successful, continue.
4. Initiate Admin Lock or Admin Maintenance state operation and edits to AC, PW and VSI objects in each endpoint node as required based on attributes to be edited and the DNA interface component requirement. Note that if an object (AC, PW, VSI) is a required state, then there is no need to perform that operation. However, DNA should leave the Admin state of an object in the same state as prior to edit operation. For example, if an object is in Admin Unlock state, DNA may perform all these operations: Lock, edit attribute and then Unlock. In order to reduce race conditions DNA should send all these operations in a single transaction. Wait for successful completion of edits to all these objects.
   a. If an edit operation requires Admin Lock state then DNA may show a warning message regarding potential data traffic impact and seek user input to continue.
   b. If an edit operation requires Admin Maintenance state then there is no warning message required.
   c. If edits to any of these objects fail, abort Ethernet service edit operation and perform error recovery as described below.
   d. If edit operation is successful, continue.
5. Delete VCMOLOCK object created in previous step. Wait until object is deleted.
   a. If object is deletion fails, retry until it is successful or the DNA interface component reports that the object does not exist.
6. Once VCMOLOCK object deletion is successful, display a message to the user to indicate successful edit to Ethernet service and exit the edit process.

DNA—Edit operation failure recovery—stop on first error: It is acceptable to keep the edit operation failure recovery simple, such as Mark the transaction state as "Edit operation failed"
Display an error message to the user and
Abort the operation on first failure DNA may also log detailed events indicating the exact failure so that user may debug the failure reason. In addition, DNA may log an event stating potential in-consistency in service state due to edit operation failure. Event may be logged on VC MO if the object exists, if not, it may be logged as a DNA event.

DNA—Edit operation failure recovery—rollback on first error: An elegant way to recover from failure is to rollback the changes to its original state. DNA may perform rollback by saving the old values and restoring them. It is possible for the rollback operation to fail. If it fails, DNA may log detailed events indicating the exact failure so that user may debug the failure reason. In addition, DNA may log an event stating potential inconsistency in service state due to edit operation failure. Recovery from Edit operation failure requires users to fix the problems causing the edit failure and then retry. Optionally, user may delete this service and create a new one.

DNA—add endpoint operation on an E-LAN Ethernet service: DNA may initiate backend programming to add an endpoint to an E-LAN Ethernet service only after user provides the complete specification. Sequence of operations may be as follows:

1. Request for new VCMOLOCK object creation in Master endpoint node. The AID of the object may be "Ethernet Interface ID of the Master endpoint % EVCID of the Ethernet service to be modified". Wait for successful creation of VCMOLOCK object.
   a. If VCMOLOCK object creation fails, then give an error message to the user as specified below.
      i. Error message may be "<EVC ID of the service to be edited> cannot be edited at this time, retry later."
   b. If VCMOLOCK object is created, then continue with the remaining steps below.
2. Create VCEP object/entry for each new endpoint that is added and update VCMO object. Update transaction states as needed.
   a. If edits to any of these objects fail, abort Ethernet service edit operation and perform error recovery as described below.
   b. Else, continue.
3. Initiate creation of AC, PW and VSI objects in each of the new endpoint node. Also, initiate creation of PWs and association of new PW to VSI in the nodes with already existing endpoints. Wait for successful creation of all these objects.
   a. If any of the object creation fails for whatever reason, abort Ethernet service creation with full rollback. That is delete successful creation of objects in previous steps.
   b. If all objects are created successfully, continue.
4. On successful completion of previous steps, update the transaction state of endpoints and then EVC.
5. Delete VCMOLOCK object created in previous step. Wait until object is deleted.
   a. If object deletion fails, retry until it is successful or the DNA interface component reports that the object does not exist.
6. Once VCMOLOCK object deletion is successful, display a message to the user to indicate successful addition of endpoints to Ethernet service and exit the edit process.

DNA—delete endpoint operation on an E-LAN Ethernet service: DNA may initiate backend programming to delete an endpoint to an E-LAN Ethernet service only after user provides the complete specification. Sequence of operations may be as follows:

1. Request for new VCMOLOCK object creation in Master endpoint node. The AID of the object may be "Ethernet Interface ID of the Master endpoint % EVCID of the Ethernet service to be modified". Wait for successful creation of VCMOLOCK object.
   a. If VCMOLOCK object creation fails, then give an error message to the user as specified below.
      i. Error message may be "<EVC ID of the service to be edited> cannot be edited at this time, retry later."
   b. If VCMOLOCK object is created, then continue with the remaining steps below.
2. Initiate deletion endpoint objects for the deleted endpoints. AC of each endpoint needs to be deleted. However, VSI objects are deleted only if there are no other endpoints associated with them. A PW is deleted if there are no ACs associated on both endpoint nodes of the PW. Objects are deleted in the order as required by NE. Association of VSI to deleted AC may be updated. Also, admin state is updated as required. Wait for successful completion of all actions.
   a. If any of the object deletion or edits fail for whatever reason, abort Ethernet service creation with full rollback. That is delete successful creation of objects in previous steps.
   b. If all actions are completed successfully, continue.
3. Delete VCEP object/entry for each deleted endpoint update VCMO object.

4. On successful completion of previous steps, update the transaction state of endpoints and then EVC.

5. Delete VCMOLOCK object created in previous step. Wait until object is deleted
   a. If object deletion fails, retry until it is successful or the DNA interface component reports that the object does not exist.

6. Once VCMOLOCK object deletion is successful, display a message to the user to indicate successful deletion of endpoints to Ethernet service and exit the edit process.

NE data path objects can be deleted only in Admin Lock state. A DNA user can delete an end-to-end service at any time. However, DNA may perform multiple operations on each endpoint including Admin state Lock on NE data path objects.

DNA—initiate Delete operation on an Ethernet service: DNA may perform the following sequence of operations to delete an Ethernet service. Delete sequence is in the reverse order of Create sequence.

1. Request for new VCMOLOCK object creation in Master endpoint node. The AID of the object may be "Ethernet Interface ID of the Master endpoint % EVCID of the Ethernet service to be deleted". Wait for successful creation of VCMOLOCK object.
   a. If VCMOLOCK object creation fails, then give an error message to the user specified below. User can go back in the workflow edit EVC ID to continue.
      i. Error message may be "<EVC ID of the service to be deleted> cannot be deleted at this time, retry later."
   b. If VCMOLOCK object is created, then continue with the remaining steps below.

2. First perform necessary delete operations on NE data path objects (AC, PW and VSI) in Master endpoint. Operations include Admin state Lock on each object and then delete operation.
   a. If deletion of any of these objects fail, abort Ethernet service edit operation and perform error recovery as described below.
   b. If all delete operations are successful, continue.

3. Then delete the DNA owned objects of Master endpoint.
   a. If deletion of any of these objects fail, abort Ethernet service edit operation and perform error recovery as described below.
   b. If all delete operations are successful, continue.

4. Finally, delete VCMOLOCK object created in the first step. Wait until object is deleted.
   a. If object is deletion fails, retry until it is successful or the DNA interface component reports that the object does not exist.

5. Once VCMOLOCK object deletion is successful, display a message to the user to indicate successful deletion of Ethernet service and exit the deletion process.

DNA—Delete operation failure recovery—stop on first error: It is acceptable to keep the delete operation failure recovery simple. That is,
   Mark the transaction state as "Delete operation failed"
   Display an error message to the user and
   Abort the operation on first failure DNA may also log detailed events indicating the exact failure so that user may debug the failure reason. In addition, DNA may log an event stating potential in-consistency in service state due to delete operation failure. Event may be logged on VC MO if the object exists, if not, it may be logged as a DNA event.

DNA—Edit operation failure recovery—retry delete operation: Optionally, DNA may retry Delete operations a few times. Even after retry, delete is not complete, then
   Mark the transaction state as "Delete operation failed"
   Display an error message to the user and
   Abort the Delete operation Recovery from Delete operation failure requires users to manually delete each object using the operations described herein. User can launch Cross-connect manager from Ethernet circuit in Circuit Manager then delete each of those objects. Context sensitive launch points help user to quickly recover from the inconsistent state.

As described, multiple DNA server instances would be managing a network. A user may create an Ethernet service through one DNA. This service needs to be discovered by other DNA instances managing the network. DNA—Ethernet circuit discovery during network discovery: DNA may discover the Ethernet circuits during network/node discovery. It is discovered by retrieving VC MO as described. Each VC MO may result in a single Ethernet circuit inventory.

DNA—Ethernet circuit discovery state: Up on discovering a new Ethernet circuit (VC MO), DNA may retrieve the associated objects such as signaled data path objects (AC, VSI, PW) for each endpoint identified in VC MO. DNA may process the state of each object and determine the overall Ethernet circuit state. Discovered state may be stored in a separate attribute. Note that the Ethernet Circuit Discovered state is specific to each DNA server instance. For example a one DNA server might have access only to one endpoint node of an Ethernet circuit (VC MO) while another DNA server instance might have access to all nodes. In this case, each DNA server will have a different discovery state. At a high level following states are possible.
   Discovery complete—when DNA has access to all nodes of an Ethernet circuit and able to retrieve all associated signaled data path objects at each endpoint
   Discovery incomplete due to missing node—DNA does not have access to all nodes of an Ethernet circuit. Note that this state is applicable, when DNA can discover some endpoints of an ELAN EVC but not all.
   Discovery incomplete due to missing objects—DNA has access to all nodes of an Ethernet circuit but it is not able to retrieve all data path objects.

DNA—impact of node related events on Ethernet circuit state: Since the Ethernet circuit discovery state is dependent on the access to nodes, DNA may reevaluate the state for any change in access to nodes which are terminating the Ethernet services. For example, consider an Ethernet circuit between NE1 and NE2. Initially DNA might have access only to NE1. This will result in an Ethernet circuit in Discovery Incomplete state. When DNA discovers NE2, it may evaluate the state of the Ethernet circuit terminating on NE2 and change to Discovery complete state.

DNA—duplicate EVC IDs across network: Customers normally use unique EVC ID for each service. Hence, if there are multiple Ethernet circuits with same EVC ID, it is an error condition. However, MOID of VCMO includes Node ID which is unique. Thus the MOID would never be duplicated in a network. Two VC MOs with same EVC ID in different nodes may result in two circuits being listed.

DNA—Admin domain/access privilege impact on Ethernet circuit inventory: Discovered Ethernet circuits are shown in the inventory for a given user based on their access privilege. However, user can edit or delete a circuit only if the user has provisioning privileges to all nodes of an Ethernet circuit. As described, Ethernet circuit create, delete and modify operation may fail due to various reasons. One of them could be DNA server failure. In this scenario, a circuit may be in Locked by a failed DNA server. Note that the Lock object contains identity of the DNA server instance that has locked the circuit. Hence, when a DNA server comes back up, it may detect such a circuit, which is stale. Transaction state for those circuits may be in In Progress or Partial state. Alternatively, a re-try operation may be supported. EVC Service state defines the data path state of the overall service. EVC service state is determined by DNA server based on the operational state of all the supporting AC, VSI and PW objects as described below. Similar to discovery state, service state is determined by each DNA server based on the operational state of the NE objects.

DNA—pre-condition for Service State determination: DNA may derive the Service State only for EVCs that are fully discovered. Hence, the Service State determined by each DNA instance may be consistent. For partially discovered EVCs, Service State may be shown as "Not Available". For example, Metro Ethernet Forum (MEF) 30.1 defines EVC data path states (Active, Not Active and Partially Active). It defines the states in the context of one endpoint of an EVC (EVC at a UNI) based on the Service OAM fault management information. Service State as defined here includes the summary of all endpoints. It is expected that NE propagates the Service OAM related faults/alarm conditions to the VSI Operational state. Also, note that the partial active state simply identifies the fact one or more data paths are down. For example, state correlation to determine bi-directional vs. uni-directional data path failure for an ELine service is not done. On this premise, state determination defined in the following requirement gives enough information to the user to further drill down to determine the root cause and take corrective action.

DNA—EVC Service State—E-Line and E-LAN services: DNA may support the following Service states for an EP-Line and EVP-Line services.

Enabled—This state is applicable when the Operational State of all the VSIs of the EVC is in Enabled state. In addition, Operational state of all the ACs and PWs of the EVC should be in Enabled state. Note that, it may be sufficient to look at only the VSI state if NE propagates AC/PW states to VSI. If not, DNA needs to process the AC and PW states.

Disabled—This state is applicable when the Operational State of all the VSIs of the EVC is in Disabled state. In addition, Operational state of all the ACs and PWs of the EVC should be in Disabled state. Note that, it may be sufficient to look at only the VSI state if NE propagates AC/PW states to VSI. If not, DNA needs to process the AC and PW states.

Partially Enabled—This state is applicable when the operational state of some of the VSIs of the EVC is in Enabled state while some are in Disabled state. In addition, operational state of some the ACs and PWs of the EVC should be in Enabled state while others in Disabled. Note that, it may be sufficient to look at only the VSI state if NE propagates AC/PW states to VSI. If not, DNA needs to process the AC and PW states.

DNA—impact on DNA Service State due to deletion of endpoints to an E-LAN EVC: When user deletes an endpoint, after the delete operational, DNA may re-evaluate the Service state for the remaining endpoints of an E-LAN EVC. For example, assume that an EVC is in Partially Enabled state. When user deletes an endpoint it may result in deleting only objects that may be in Disabled state. It leaves the EVC with objects that are in Enabled state. Hence, the EVC Service State needs to change to Enabled state.

DNA—impact on DNA Service State due to addition of endpoints to an E-LAN EVC: When user adds one or more endpoints to an existing EVC, Service State should not be updated until the endpoint is fully added to the EVC (in other words, ACs and associated PWs in all nodes must be created and updated). Once the endpoint is fully configured, EVC Service State may be re-evaluated considering the Operational state of all the new supporting objects. DNA VC MO is managed solely by DNA though the data is stored in NE. The DNA interface component does not propagate any alarms to DNA VC MO.

DNA—alarm propagation: DNA may propagate data path specific alarms raised on NE owned signaled objects AC, VSI and PW at each endpoints of a service to the corresponding DNA owned object (DNA VC MO). Following steps capture the alarm propagation process:

the DNA interface component (NE) raises alarms AC, VSI, PW objects whenever it detects a fault condition the DNA interface component changes the Operational state of the corresponding object to Disabled whenever it detects data path impacting fault conditions As described, DNA monitors the changes in Operational state of the data path objects and updates EVC Service state DNA raises and clears DNA specific EVC alarms based on EVC service state change Note that the propagated alarm status is not stored in the VC MO object as it results in an another write operation to the NE. Instead each DNA instance may propagate the alarms locally and display the alarm status. Also, as described earlier, Service State is updated only for fully discovered EVCs. Hence, multiple DNA instances should provide the same status at any given moment. DNA server may propagate alarms to VC MO for the endpoint it has access to. However, if a DNA server instance does not have access to all endpoint nodes, in other words Discovery state is not complete, then alarm status may not be accurate. Operational state of the data path objects and updates EVC Service state.

Benefits of the methods and systems described include consistent and efficient programming of multiple network elements with orchestrated network programming in the required sequence, performing operations in parallel as much as possible for efficiency, and serialize only when there is dependency. In case of intermediate failures, rollback prior successful operations such that there is no inconsistency in the network. To recover from situations where network inconsistency cannot be avoided, provide sufficient information to users to manually fix the inconsistencies.

Examples of devices that may use the methods and systems described herein may include network administration software components (such as Infinera's DNA and PXM), routers or switches, such as Infinera's DTN-X platform, that may have multiple functionalities like L0 wavelength division multiplexing (WDM) transport capabilities, L1 digital OTN switching capabilities, and L2 packet switching capabilities. The network may be optimized by enabling the packet switching feature in network devices using protocols such as MPLS-TP and switching LSP's, and packet switching in the network core can be performed by the devices.

The word "exemplary" is used herein to mean "serving as an example, instance, or illustration." Any details described herein as "exemplary" is not necessarily to be construed as preferred or advantageous over other examples. Likewise, the term "examples" does not require that all examples include the discussed feature, advantage or mode of operation. Use of the terms "in one example," "an example," "in one feature," and/or "a feature" in this specification does not necessarily refer to the same feature and/or example. Furthermore, a particular feature and/or structure can be combined with one or more other features and/or structures. Moreover, at least a portion of the apparatus described hereby can be configured to perform at least a portion of a method described hereby.

The terminology used herein is for the purpose of describing particular examples only and is not intended to be limiting of examples of the disclosure. As used herein, the singular forms "a," "an," and "the" are intended to include the plural forms as well, unless the context clearly indicates otherwise. It will be further understood that the terms "comprises", "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should be noted that the terms "connected," "coupled," or any variant thereof, mean any connection or coupling, either direct or indirect, between elements, and can encompass a presence of an intermediate element between two elements that are "connected" or "coupled" together via an intermediate element.

Any reference herein to an element using a designation such as "first," "second," and so forth does not limit the quantity and/or order of those elements. Rather, these designations are used as a convenient method of distinguishing between two or more elements and/or instances of an element. Thus, a reference to first and second elements does not mean that only two elements can be employed, or that the first element must necessarily precede the second element. Also, unless stated otherwise, a set of elements can comprise one or more elements.

Further, many examples are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the examples described herein, the corresponding form of any such examples may be described herein as, for example, "logic configured to" perform the described action.

Nothing stated or illustrated depicted in this application is intended to dedicate any component, step, feature, benefit, advantage, or equivalent to the public, regardless of whether the component, step, feature, benefit, advantage, or the equivalent is recited in the claims.

Further, those of skill in the art will appreciate that the various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

Although some aspects have been described in connection with a device, it goes without saying that these aspects also constitute a description of the corresponding method, and so a block or a component of a device should also be understood as a corresponding method step or as a feature of a method step. Analogously thereto, aspects described in connection with or as a method step also constitute a description of a corresponding block or detail or feature of a corresponding device. Some or all of the method steps can be performed by a hardware apparatus (or using a hardware apparatus), such as, for example, a microprocessor, a programmable computer or an electronic circuit. In some examples, some or a plurality of the most important method steps can be performed by such an apparatus.

In the detailed description above it can be seen that different features are grouped together in examples. This manner of disclosure should not be understood as an intention that the claimed examples require more features than are explicitly mentioned in the respective claim. Rather, the situation is such that inventive content may reside in fewer than all features of an individual example disclosed. Therefore, the following claims should hereby be deemed to be incorporated in the description, wherein each claim by itself can stand as a separate example. Although each claim by itself can stand as a separate example, it should be noted that—although a dependent claim can refer in the claims to a specific combination with one or a plurality of claims—other examples can also encompass or include a combination of said dependent claim with the subject matter of any other dependent claim or a combination of any feature with other dependent and independent claims. Such combinations are proposed herein, unless it is explicitly expressed that a specific combination is not intended. Furthermore, it is also intended that features of a claim can be included in any other independent claim, even if said claim is not directly dependent on the independent claim.

It should furthermore be noted that methods disclosed in the description or in the claims can be implemented by a device comprising means for performing the respective steps or actions of this method.

Furthermore, in some examples, an individual step/action can be subdivided into a plurality of sub-steps or contain a plurality of sub-steps. Such sub-steps can be contained in the disclosure of the individual step and be part of the disclosure of the individual step.

While the foregoing disclosure shows illustrative examples of the disclosure, it should be noted that various changes and modifications could be made herein without departing from the scope of the disclosure as defined by the appended claims. The functions, steps and/or actions of the method claims in accordance with the examples of the disclosure described herein need not be performed in any particular order. Additionally, well-known elements will not be described in detail or may be omitted so as to not obscure the relevant details of the aspects and examples disclosed herein. Furthermore, although elements of the disclosure may be described or claimed in the singular, the plural is contemplated unless limitation to the singular is explicitly stated.

What is claimed is:

1. A method comprising:
   receiving, by a first controller, a first request for an Ethernet connection between a first device in a network and a second device in the network;
   sending, by the first controller, a first command to the first device, the first command instructing the first device to decline a simultaneous request for the Ethernet connection by a second controller;
   sending first connection data to the first device, the first connection data identifying the first device as a first end point of the Ethernet connection and the second device as a second end point of the Ethernet connection;
   sending second connection data to the first device, the second connection data identifying attributes of the Ethernet connection;
   sending third connection data to the second device, the third connection data identifying the attributes of the Ethernet connection;
   sending a second command to the first device, the second command instructing the first device to stop declining the simultaneous request for the Ethernet connection; and
   sending data from the first device to the second device over the Ethernet connection.

2. The method of claim 1, further comprising:
   sending the first connection data, by the first device, to the second device; and
   wherein the third connection data is sent to the second device by the first device.

3. The method of claim 1, further comprising:
   sending, by the second controller, a third command to the first device, the third command instructing the first device to decline a simultaneous request for the Ethernet connection;
   sending a failure notice to the second controller by the first device in response to receiving the third command.

4. The method of claim 1, further comprising:
   sending a failure notice to the first controller by the first device in response to receiving the first command; and sending the second command to the first device without sending data from the first device to the second device over the Ethernet connection.

5. The method of claim 1, further comprising:
   sending a failure notice to the first controller by the first device in response to receiving the first connection data; and sending the second command to the first device without sending data from the first device to the second device over the Ethernet connection.

6. The method of claim 1, further comprising:
   sending a failure notice to the first controller by the first device in response to receiving the second connection data; and sending the second command to the first device without sending data from the first device to the second device over the Ethernet connection.

7. The method of claim 1, further comprising:
   sending a failure notice to the first controller by the first device in response to receiving the third connection data; and sending the second command to the first device without sending data from the first device to the second device over the Ethernet connection.

8. The method of claim 1, further comprising sending a success notice to the first controller in response to the sending data from the first device to the second device over the Ethernet connection.

9. An apparatus comprising:
   a first circuit configured to receive a first request for an Ethernet connection between a first device in a network and a second device in the network;
   the first circuit configured to send a first command to the first device, the first command instructing the first device to decline a simultaneous request for the Ethernet connection by a second controller;
   the first circuit configured to send first connection data to the first device, the first connection data identifying the first device as a first end point of the Ethernet connection and the second device as a second end point of the Ethernet connection;
   the first circuit configured to send second connection data to the first device, the second connection data identifying attributes of the Ethernet connection;
   the first circuit configured to send third connection data to the second device, the third connection data identifying the attributes of the Ethernet connection;
   the first circuit configured to send a second command to the first device, the second command instructing the first device to stop declining the simultaneous request for the Ethernet connection; and
   wherein the first device sends data from the first device to the second device over the Ethernet connection.

10. The apparatus of claim 9, further comprising:
    a second circuit configured to send the first connection data to the second device; and
    wherein the third connection data is sent to the second device by the first device.

11. The apparatus of claim 9, further comprising:
    the first circuit configured to send a third command to the first device, the third command instructing the first device to decline subsequent requests for additional Ethernet connections;
    the first circuit configured to send a failure notice to the first controller in response to receiving the third command.

12. The apparatus of claim 9, further comprising:
the first circuit configured to send a failure notice to the first controller in response to receiving the first command; and a second circuit configured to send the second command to the first device without sending data from the first device to the second device over the Ethernet connection.

13. The apparatus of claim 9, further comprising:
the first circuit configured to send a failure notice to the first controller in response to receiving the first connection data; and a second circuit configured to send the second command to the first device without sending data from the first device to the second device over the Ethernet connection.

14. The apparatus of claim 9, further comprising:
the first circuit configured to send a failure notice to the first controller in response to receiving the second connection data; and a second circuit configured to sending the second command to the first device without sending data from the first device to the second device over the Ethernet connection.

15. The apparatus of claim 9, further comprising:
the first circuit configured to send a failure notice to the first controller in response to receiving the third connection data; and a second circuit configured to send the second command to the first device without sending data from the first device to the second device over the Ethernet connection.

16. The apparatus of claim 9, further comprising a second circuit configured to send a success notice to the first controller in response to sending data from the first device to the second device over the Ethernet connection.

17. A non-transient computer readable medium containing program instructions for causing a processor to perform a process comprising:
receiving, by a first controller, a first request for an Ethernet connection between a first device in a network and a second device in the network;
sending, by the first controller, a first command to the first device, the first command instructing the first device to decline a simultaneous request for the Ethernet connection by a second controller;
sending first connection data to the first device, the first connection data identifying the first device as a first end point of the Ethernet connection and the second device as a second end point of the Ethernet connection;
sending second connection data to the first device, the second connection data identifying attributes of the Ethernet connection;
sending third connection data to the second device, the third connection data identifying the attributes of the Ethernet connection;
sending a second command to the first device, the second command instructing the first device to stop declining the simultaneous request for the Ethernet connection; and
sending data from the first device to the second device over the Ethernet connection.

18. The non-transient computer readable medium of claim 17, further comprising:
sending the first connection data, by the first device, to the second device; and
wherein the third connection data is sent to the second device by the first device.

19. The non-transient computer readable medium of claim 17, further comprising:
sending, by the second controller, a third command to the first device, the third command instructing the first device to decline a subsequent request for the Ethernet connection by a third controller;
sending a failure notice to the first controller by the first device in response to receiving the third command.

20. The non-transient computer readable medium of claim 17, further comprising:
sending a failure notice to the first controller by the first device in response to receiving the first command; and sending the second command to the first device without sending data from the first device to the second device over the Ethernet connection.

* * * * *